Figure 1:
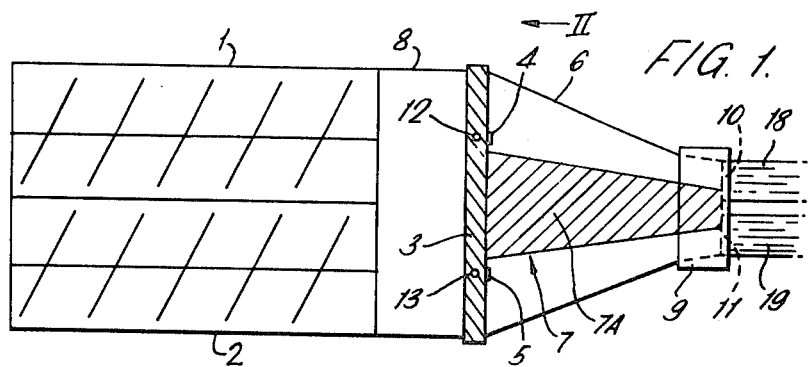

United States Patent [19]

Hunt et al.

[11] 4,222,979
[45] Sep. 16, 1980

[54] MANUFACTURE OF MARBLED DETERGENT BARS

[75] Inventors: Leslie Hunt, Wirral; Ian T. Nicolson, Birkenhead; Thomas M. Whitfield, Wirral, all of England

[73] Assignee: Lever Brothers Company, New York, N.Y.

[21] Appl. No.: 936,080

[22] Filed: Aug. 22, 1978

[30] Foreign Application Priority Data

Aug. 25, 1977 [GB] United Kingdom ............... 35691/77

[51] Int. Cl.² .............................................. B29F 3/12
[52] U.S. Cl. ..................................... 264/75; 264/148; 264/171; 264/245; 264/294; 264/325; 425/131.1
[58] Field of Search ................. 264/171, 148, 75, 325, 264/245, 294; 425/131.1, 192, 204–208

[56] References Cited

U.S. PATENT DOCUMENTS

| 3,779,676 | 12/1973 | Bernard | 425/192 |
| 3,884,605 | 5/1975 | Grelon | 425/131.1 |
| 3,890,419 | 6/1975 | Kaniecki | 425/131.1 |
| 3,923,438 | 12/1975 | Perla | 425/131.1 |
| 3,947,200 | 3/1976 | Fischer | 425/131.1 |

Primary Examiner—Jeffery R. Thurlow

[57] ABSTRACT

A liquid component can be introduced into a detergent bar by injecting liquid within or immediately downstream of a multi-apertured plate positioned before the compression cone of an extruder. The method can be used to produce marbled bars with the aid of a colored liquid and is described in U.K. Pat. No. 1,387,567.

When a double extruder is used together with a common compression cone the injected liquid becomes unevenly distributed within the detergent. Even distribution of the liquid as striations is achieved by use of a partition in the cone to ensure each detergent stream is subjected to separate compression during movement down the cone. The partition extends to the final extrusion plate; the velocities of the two streams are equalized by having a common extrusion volume between after the two screw extruders.

6 Claims, 3 Drawing Figures

U.S. Patent Sep. 16, 1980 4,222,979

MANUFACTURE OF MARBLED DETERGENT BARS

This invention relates to apparatus and methods for the injection of liquids into a detergent mass for the formation of detergent bars. The invention is particularly suited for injection into a detergent mass of a liquid including a material contrasting in visual appearance with the detergent material.

When a colour contrast liquid is injected the resulting detergent bar has a multi-coloured appearance which may be described as striped, mottled or marbled, dependent on the subjective assessment. The apparatus and method may also be utilised to introduce a liquid into a detergent mass containing additives, for example germicides and skin benefit materials, which are required to be distributed throughout the mass.

In Applicants' U.K. Pat. No. 1,387,567 there is described and claimed method and apparatus for introducing liquids into detergent bars. In this previous disclosure the method of manufacturing detergent bars comprises the steps of passing a detergent mass through a multi-apertured plate to form rods, introducing a liquid between the rods in at least one position, compressing the rods inwardly to form a continuous mass having striations of the liquid therein, cutting the mass into billets and stamping the latter to form bars.

The term "detergent" is used herein to include both soaps, ie alkali metal salts of long chain fatty acids and non-soap synthetic detergents, ie salts of alkyl sulphates, alkaryl sulphonates, alkane sulphonates and sulphonated long chain fatty acids. There is no criticality in the detergent provided it is extrudable. The injection points for introducing liquid into the detergent mass may be positioned in conduits extending through the apertures of the multi-apertured plate as disclosed in U.K. Pat. No. 1,387,567.

The disclosure in U.K. Pat. No. 1,387,567 is incorporated herein by reference.

In the Applicants' previously disclosed method the liquid which is introduced between the rods in at least one position is distributed substantially throughout the detergent mass in a uniform manner by the inward compression exerted on the rods as they pass through the extrusion cone which has a decreasing sectional area. The specific embodiments described relate to a single screw plodder extruding a detergent mass into a single extrusion cone. At the interface between the multi-apertured plate at which the liquid is injected and the extrusion cone the sectional areas of the plate and cone correspond. Therefore the detergent rods are extruded over an area and are immediately subjected to compression within a cone reducing in area from the area of the plate.

In copending patent application Ser. No. 779,774, filed Mar. 21, 1977, now U.S. Pat. No. 4,162,288 issued July 24, 1979 the applicants describe and claim a method of injecting a liquid into a detergent mass wherein a detergent mass is passed through two extruders and respective apertured pressure plate areas into a common extrusion cone and liquid is injected within or immediately downstream of the apertured plate areas in at least one position characterised in that a partition is provided extending downstream from the un-apertured area between the apertured pressure plate areas and carrying substantial cylindrical cone side surfaces to form separate compression volumes for each detergent stream; and apparatus for performing the method.

The use of a partition in the extrusion cone causes the liquid to be distributed substantially evenly throughout the detergent streams. The optional feature of having the partition terminate upstream of the extrusion plate allows the two compressed bundles of detergent material to contact so that their velocities are equalised.

The present application described an improvement in the invention of the aforementioned application Ser. No. 779,774 now U.S. Pat. No. 4,162,288 issued July 24, 1979. The present method and apparatus provide a more definite and consistent external distribution of liquid by having the partition extend to the extrusion plate. By this configuration the two streams of detergent are retained separate after the liquid has been injected. The equalisation of velocities of the two streams is provided by an extrusion volume common to the two screw extruder barrels; in this common extrusion volume the two streams are brought into contact and any velocity difference is removed. The invention provides a method of injecting a liquid into a detergent mass wherein a detergent mass is passed through two parallel extruders and respective apertured pressure plate areas into a common extrusion cone and liquid is injected within or immediately downstream of the apertured plate areas in at least one position on each plate area characterised in that a partition is provided extending from the un-apertured area between the apertured pressure plate areas to the extrusion plate and carrying substantial cylindrical cone side surfaces to form separate compression volumes for each detergent stream, and a common extrusion volume is present between the extruders and the extrusion cone. The invention also provides detergent processing apparatus suitable for performing the method of the invention and comprising (i) two parallel extruders, (ii) a common extrusion volume into which the two extruders open, (iii) a common extrusion cone in communication with the extrusion volume (iv) apertured pressure plate areas between the common extrusion volume and the extrusion cone, (v) liquid injection means positioned within or immediately downstream of the apertured plate areas and (vi) a partition extending from the un-apertured area between the apertured pressure plate areas to the extrusion plate, having side surfaces, which form, together with the inner surfaces of the extrusion cone, separate compression volumes for each detergent stream.

Having the two streams extruded at substantially the same velocity allows formation of billets by a single knife or two knives operated coincidently.

Figure 2:
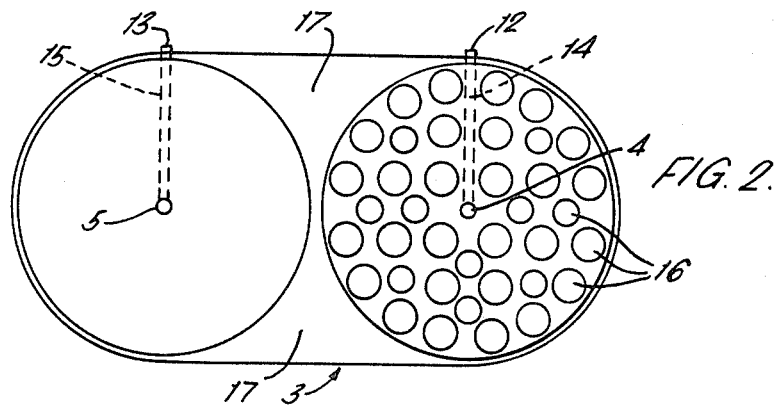
Figure 3:
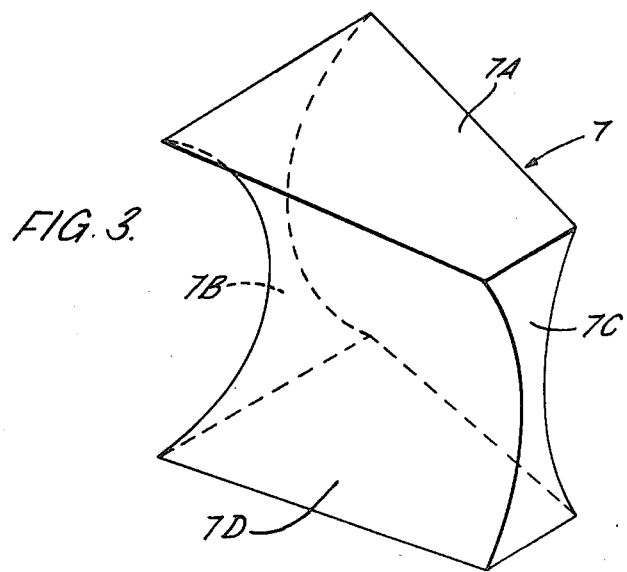

An embodiment of the apparatus and an example of the process of the invention will now be described with reference to the accompanying diagrammatic drawings in which FIG. 1 shows a plan view of part of a twin screw plodder with the upper surface of the plodder extruders and compression cone removed to show the interior arrangements, FIG. 2 is an end view of the multi-apertured liquid injection plate viewed in the direction of arrow II and, FIG. 3 is an isometric view of the partition.

In FIG. 1 screw extruders 1 and 2 are positioned side by side and extrude detergent material through common extrusion volume 8 and multi-apertured plate 3 in sequence. The volume 8 is of a length sufficient to allow the velocities of the two streams to become substantially equal during contact. This plate carries injection points 4, 5 centrally positioned within apertured circular areas. In FIG. 2 the apertures in one area are not shown. Plate 3 has about 60 apertures each of about 35 mm diameter. The injection points are supplied with liquid under pressure through conduits 14, 15 and conduit openings 12, 13 respectively. More than one injection point may be present for each apertured area. The detergent mass is formed into rods by passage through the apertured plate and passes through an extrusion (compression) cone 6 which terminates at a twin apertured extrusion plate 9. Plate 9 has apertured 10, 11 through which continuous detergent masses 18, 19 are extruded. When a liquid with colour contrasting to the base detergent material is injected through point 4, 5 the detergent masses 18, 19 have striped or marbled appearance.

A partition 7 is positioned adjacent the downstream face of the multi-apertured plate 3. The partition comprises an upstream face 7B which abuts non-apertured area 17 of the multi-apertured plate. The partition 7 comprises, in addition to the upstream face 7B, a downstream face 7C which has a shape similar to 7B but of smaller dimensions. The upper face 7A and a corresponding bottom surface abut the inner top and bottom surfaces of the compression cone. Side surface 7D and a corresponding surface on the other side of the partition are curved in substantially cylindrical cone form to ensure the bundles of rods extruded through apertures 16 of the multi-apertured plate 3 are separately subjected to substantially even inward pressures while moving between the apertured plate 3 and the downstream apertured plate 9. Surface 7D and the corresponding surface are shaped so that each detergent stream passes through a separate compression volume. The separate compression volumes are formed by providing the upstream end portions of surface 7D and face 7B, with a smaller effective radius of curvature than the downstream end portions adjacent to the downstream face 7C. Downstream surface 7C abuts plate 9 between apertures 10, 11. Between surface 7C and plate 9 there may be positioned an insert, the section of which is not a continuation of the section of the partition. Some deviation from the substantially cylindrical cone surfaces can be tolerated without affecting the functioning of the partition.

When a detergent mass is extruded through the apertures on each of the circular areas in plate 3 bundles of rods are formed and as these bundles are compressed inwardly the liquid injected through injection points 4, 5 is distributed substantially uniformly throughout the bundle. An optional feature is the presence in the extrusion cone of a multi-apertured plate in each extrusion stream positioned between plates 3 and 9. Passage of the detergent streams through these plates improves the quality of striping.

A white soap base comprising sodium salts of tallow and coconut fatty acids was extruded through apertured plate 3 and a liquid containing suspended blue dye injected through points 4, 5. The dye liquid had a composition in percentages by weight, of water 9.5%, glycerine 83%, sodium carboxymethyl cellulose 1.5%, Monastral Blue BVS Paste 2%, Ansteads Green 11125 4%. Monastral is a Registered Trade Mark. The amount of liquid injected was 500 grams per 100 kilogrammes of soap and the extruded mass which had a blue striping was cut into billets and stamped to form bars.

The external striping of each extruded stream was consistent around the stream; this follows from the streams being maintained separate after the liquid injection position.

What is claimed is:

1. A method of injecting a liquid into a detergent mass comprising passing a detergent mass through two parallel extruders and respective apertured pressure plate means into a common extrusion cone terminating in an extrusion plate, said apertured pressure plate means including two separate multi-apertured portions, injecting a liquid within or immediately downstream of the apertured plate means in at least one position on each of said two multi-apertured portions, arranging a partition transversely of said plate means and between said multi-apertured portions, said partition extending to said extrusion plate and carrying substantial cylindrical cone side surfaces to form separate compression volumes for each detergent stream, and arranging a common extrusion volume between the extruders and the extrusion cone.

2. A method according to claim 1 wherein the detergent mass passes through a second apertured plate within each compression volume.

3. A method according to claim 1 or 2 wherein the liquid contrasts in visual appearance with the detergent mass.

4. A method according to claim 1 wherein the extruded masses leaving the extrusion cone are cut into billets.

5. A method according to claim 4 wherein the billets are stamped to form detergent bars.

6. Detergent processing apparatus suitable for the injection of liquid into a detergent mass, comprising:
   (i) two parallel extruders,
   (ii) a common extrusion volume arranged downstream of the extruders and into which the two extruders open,
   (iii) a common extrusion cone in communication with the extrusion volume, said cone terminating in an extrusion plate,
   (iv) apertured pressure plate means between the common extrusion volume and the extrusion cone, said plate means including two separate multi-apertured portions,
   (v) liquid injection means positioned within or immediately downstream of the apertured plate means, and
   (vi) a partition extending from and between the two multi-apertured portions of the apertured pressure plate means to the extrusion plate, said partition having side surfaces which form, together with the inner surfaces of the extrusion cone, separate compression volumes for each detergent stream.

* * * * *